US012009132B2

(12) United States Patent
Morita et al.

(10) Patent No.: US 12,009,132 B2
(45) Date of Patent: Jun. 11, 2024

(54) REACTOR UNIT

(71) Applicant: TOYOTA JIDOSHA KABUSHIKI KAISHA, Toyota (JP)

(72) Inventors: Yoshihiro Morita, Okazaki (JP); Kenjiro Shiba, Takahama (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 268 days.

(21) Appl. No.: 17/454,212

(22) Filed: Nov. 9, 2021

(65) Prior Publication Data

US 2022/0208431 A1 Jun. 30, 2022

(30) Foreign Application Priority Data

Dec. 28, 2020 (JP) ................................ 2020-218312

(51) Int. Cl.
*H01F 27/10* (2006.01)

(52) U.S. Cl.
CPC .................................. *H01F 27/10* (2013.01)

(58) Field of Classification Search
CPC ................................ H01F 27/10; H01F 27/22
USPC ........................................................ 336/60
See application file for complete search history.

(56) References Cited

U.S. PATENT DOCUMENTS

2010/0033928 A1* 2/2010 Shioiri ................ H01F 27/085 361/690
2012/0237171 A1 9/2012 Oki
2017/0251575 A1 8/2017 Nakamura et al.
2019/0189329 A1* 6/2019 Roan ...................... H01F 37/00
2021/0112689 A1 4/2021 Hashii et al.
2021/0151237 A1* 5/2021 Fujii ...................... H01F 37/00
2021/0151238 A1* 5/2021 Kim ....................... H01F 38/14

FOREIGN PATENT DOCUMENTS

DE 102011076227 A1 * 11/2012 ............ H01F 27/22
DE 102014221631 A1 * 9/2015 ............ H01F 27/08
JP 2007234752 A * 9/2007
JP 2009188033 A 8/2009
JP 2010010453 A 1/2010
JP 2012252135 A 12/2012
JP 2013125857 A 6/2013
JP 2014154757 A * 8/2014
JP 2015188016 A * 10/2015
JP 2017041497 A * 2/2017 ............ H01F 37/00
JP 2017153269 A 8/2017
JP 2019176058 A 10/2019
WO 2018193588 A1 10/2018
WO WO-2019176203 A1 * 9/2019 .......... H01F 27/025

* cited by examiner

*Primary Examiner* — Shawki S Ismail
*Assistant Examiner* — Joselito S. Baisa
(74) *Attorney, Agent, or Firm* — Hunton Andrews Kurth LLP

(57) ABSTRACT

A reactor unit is equipped with a reactor and a cooler. A coolant flows through an interior of the cooler. The cooler cools the reactor through radiation of heat to the coolant. The reactor is mounted on an upper surface of an upper plate of the cooler. A lower surface of the reactor faces the upper plate of the cooler. An upper surface of the reactor is covered with a metal plate. The metal plate is thermally in contact with the upper surface of the upper plate of the cooler.

1 Claim, 5 Drawing Sheets

REACTOR UNIT

CROSS-REFERENCE TO RELATED APPLICATION

This application claims priority to Japanese Patent Application No. 2020-218312 filed on Dec. 28, 2020, incorporated herein by reference in its entirety.

BACKGROUND

1. Technical Field

The present disclosure relates to a rector unit.

2. Description of Related Art

A conventional reactor unit is disclosed in, for example, Japanese Unexamined Patent Application Publication No. 2017-153269 (JP 2017-153269 A).

SUMMARY

In the reactor unit described in the above-mentioned document, a reactor is arranged on a reactor cooling surface that is one of outer surfaces of a cooler. Heat is radiated to the cooler from a surface of the reactor facing the cooler, and only heat radiation through the atmosphere is possible from the other surface.

The present disclosure proposes a reactor unit that can enhance the capability of cooling a reactor.

A reactor unit according to the present disclosure is equipped with a reactor and a cooler. A coolant flows through an interior of the cooler. The cooler cools the reactor through radiation of heat to the coolant. The cooler has a reactor cooling surface that is one of outer surfaces of the cooler. The reactor is mounted on the reactor cooling surface. The reactor has a first surface facing the reactor cooling surface and a second surface that is a surface located opposite the first surface. The reactor unit is further equipped with a metal plate that covers the second surface and that is thermally in contact with the reactor cooling surface.

The reactor is cooled through radiation of heat from the first surface of the reactor to the cooler. The reactor is cooled through formation of a heat radiation path from the second surface of the reactor to the cooler by the metal plate. Heat is radiated from both the first surface and the second surface to the cooler. Therefore, the capability of cooling the reactor can be enhanced.

The difference between the temperatures of the first surface and the second surface of the reactor can be reduced by enabling radiation of heat to the cooler from the second surface from which only heat radiation through the atmosphere was possible conventionally, and promoting the cooling of the second surface. Thus, the temperature of a core at the center of the reactor can be lowered, so the output of the reactor can be increased.

The reactor unit may be further equipped with a heat radiating member having an elastic force. The heat radiating member may be arranged at least either between the first surface and the reactor cooling surface or between the second surface and the metal plate. The efficiency of heat conduction from the reactor to the cooler can be enhanced, and the performance of cooling the reactor can be enhanced by interposing the heat radiating member between the reactor and the cooler and/or between the reactor and the metal plate. The heat radiating member can be made to function as a damper for damping kinetic energy, by adopting an elastic body as the heat radiating member between the reactor and the cooler and/or between the reactor and the metal plate. Thus, vibrations of the reactor can be damped. As a result, it is possible to suppress the transmission of vibrations of the reactor, and reduce noise and vibrations.

In the reactor unit, the heat radiating member may include a gel material. The heat radiating member may be formed in the shape of a sheet. However, the areas of contact of the heat radiating member with the reactor, the cooler, and the metal plate can be increased by applying the heat radiating member including the gel material. The efficiency of heat conduction from the reactor to the cooler can be enhanced, so the performance of cooling the reactor can be further enhanced.

According to the present disclosure, it is possible to enhance the capability of cooling the reactor.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein.

DETAILED DESCRIPTION OF EMBODIMENTS

One of the embodiments will be described hereinafter based on the drawings. In the following description, like components are denoted by like reference symbols. Those components are identical in name and function as well. Accordingly, the detailed description of those components will not be repeated.

General Configuration

Figure 1:
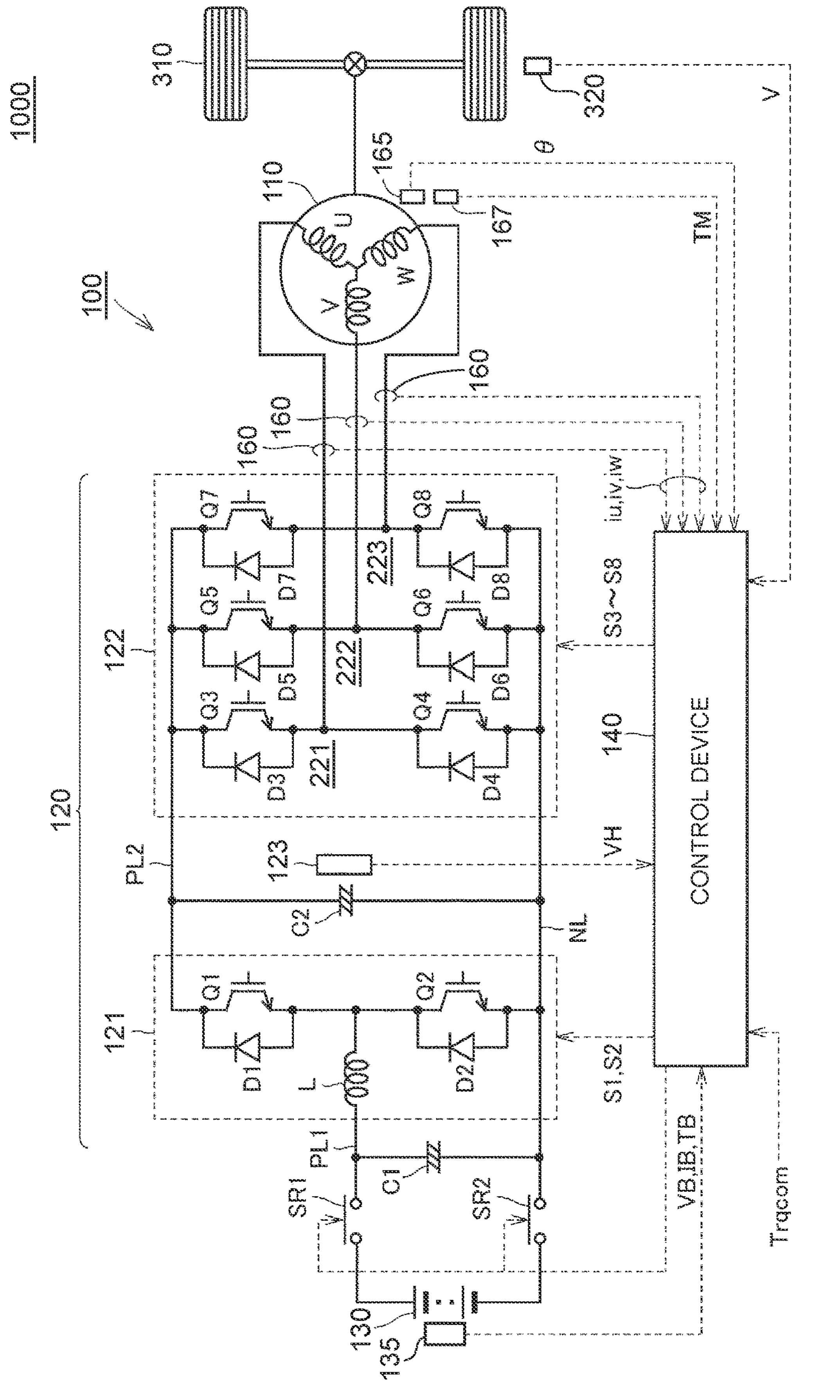
FIG. 1 is a general configuration view of a vehicle that is equipped with a reactor according to one of the embodiments.

FIG. 1 is a general configuration view of a vehicle 1000 that is equipped with a reactor L according to the embodiment. The vehicle 1000 is an electric automobile. The vehicle 1000 may be a hybrid automobile or a fuel cell-powered automobile.

As shown in FIG. 1, the vehicle 1000 is equipped with a motor drive system 100, driving wheels 310, and a vehicle speed sensor 320. The motor drive system 100 is equipped with a motor-generator 110, a power control unit (PCU) 120, a battery 130, a monitoring unit 135, system main relays SR1 and SR2, a control device 140, a current sensor 160, a rotational angle sensor (resolver) 165, and a temperature sensor 167.

The motor-generator 110 is, for example, a driving electric motor that generates a torque for driving the driving wheels 310 of the vehicle 1000. The motor-generator 110 is an AC rotating electrical machine, and is configured as, for example, a permanent magnet-type synchronous electric motor that is equipped with a rotor in which a permanent magnet is embedded. The motor-generator 110 may further function as an electric power generator, and may be configured to function as both the electric motor and the electric power generator.

The battery 130 is configured as a secondary battery such as a nickel hydride battery or a lithium-ion battery. The secondary battery may be a secondary battery having a liquid electrolyte between a positive electrode and a negative electrode, or a secondary battery (all-solid battery) having a solid electrolyte. The battery 130 may be configured as an electrical double-layer capacitor or the like.

The monitoring unit 135 detects a voltage (battery voltage) VB of the battery 130, an input/output current (battery current) D3 of the battery 130, and a temperature (battery temperature) TB of the battery 130, and outputs signals indicating results of detection to the control device 140.

The system main relay SR1 is connected between a positive electrode terminal of the battery 130 and an electric power line PL1. The system main relay SR2 is connected between a negative electrode terminal of the battery 130 and an electric power line NL. The open/closed states of the system main relays SR1 and SR2 are changed over in accordance with a control signal from the control device 140.

The PCU 120 steps up a DC electric power supplied from the battery 130, converts the DC electric power into an AC electric power, and supplies the AC electric power to the motor-generator 110. Besides, the PCU 120 converts an AC electric power generated by the motor-generator 110 into a DC electric power, and supplies the DC electric power to the battery 130. That is, the battery 130 can exchange electric power with the motor-generator 110 via the PCU 120.

The PCU 120 includes a capacitor C1, a step-up/down converter 121, a capacitor C2, an inverter 122, and a voltage sensor 123.

The capacitor C1 is connected between the electric power line PL1 and the electric power line NL. The capacitor C1 smoothens the battery voltage VB, and supplies the smoothened battery voltage to the step-up/down converter 121. Incidentally, a voltage sensor that detects a voltage between both ends of the capacitor C1 may be provided, and a detection value of the voltage sensor may be used as the battery voltage VB.

The step-up/down converter 121 steps up the battery voltage VB in accordance with control signals S1 and S2 from the control device 140, and supplies the stepped-up voltage to the electric power lines PL2 and NL. Besides, the step-up/down converter 121 steps down a DC voltage between the electric power lines PL2 and NL supplied from the inverter 122, in accordance with the control signals S1 and S2 from the control device 140, and charges the battery 130.

In concrete terms, the step-up/down converter 121 includes the reactor L, switching elements Q1 and Q2, and diodes D1 and D2. The reactor L is connected between a connection node of the switching elements Q1 and Q2 and the electric power line PL1. For example, an insulated gate bipolar transistor (IGBT), a metal oxide semiconductor (MOS) transistor, a bipolar transistor, or the like can be used as each of the switching elements Q1 and Q2 and switching elements Q3 to Q8 that will be described later. The diodes D1 and D2 are connected in an inverse-parallel manner between collectors and emitters of the switching elements Q1 and Q2 respectively.

The capacitor C2 is connected between the electric power line PL2 and the electric power line NL. The capacitor C2 smoothens the DC voltage supplied from the step-up/down converter 121, and supplies the smoothened DC voltage to the inverter 122. The voltage sensor 123 detects a voltage between both ends of the capacitor C2, namely, a voltage (hereinafter referred to also as "a system voltage") VH between the electric power lines PL2 and NL that link the step-up/down converter 121 and the inverter 122 with each other, and outputs a signal indicating a result of detection to the control device 140.

The inverter 122 includes a U-phase arm 221, a V-phase arm 222, and a W-phase arm 223. The arms of the respective phases are connected in parallel between the electric power line PL2 and the electric power line NL. The U-phase arm has the switching elements Q3 and Q4 that are connected in series to each other. The V-phase arm 222 has the switching elements Q5 and Q6 that are connected in series to each other. The W-phase arm 223 has the switching elements Q7 and Q8 that are connected in series to each other. Diodes D3 to D8 are connected in an inverse-parallel manner between collectors and emitters of the switching elements Q3 to Q8 respectively.

A midpoint between the respective phase arms is connected to a phase end of each of phase coils of the motor-generator 110. A midpoint between the switching elements Q3 and Q4 is connected to one end of the U-phase coil of the motor-generator 110. A midpoint between the switching elements Q5 and Q6 is connected to one end of the V-phase coil of the motor-generator 110. A midpoint between the switching elements Q7 and Q8 is connected to one end of the W-phase coil of the motor-generator 110. The other ends of the three coils, namely, the U-phase coil, the V-phase coil, and the W-phase coil of the motor-generator 110 are commonly connected to a neutral point.

Upon being supplied with the system voltage VH, the inverter 122 converts a DC voltage into an AC voltage and drives the motor-generator 110, in accordance with the control signals S3 to S8 from the control device 140. Thus, the motor-generator 110 is controlled by the inverter 122 in such a manner as to generate a torque corresponding to a torque command value Trqcom.

When the torque command value of the motor-generator 110 is positive (Trqcom>0), the inverter 122 converts a DC voltage into an AC voltage and drives the motor-generator 110 in such a manner as to output a positive torque, through switching operations of the switching elements Q3 to Q8 according to the control signals S3 to S8 from the control device 140. Thus, the motor-generator 110 is driven in such a manner as to generate a positive torque.

When the torque command value of the motor-generator 110 is zero (Trqcom=0), the inverter 122 converts a DC voltage into an AC voltage and drives the motor-generator 110 such that the torque becomes equal to zero, through switching operations of the switching elements Q3 to Q8 according to the control signals S3 to S8 from the control device 140. Thus, the motor-generator 110 is driven in such a manner as to generate the torque equal to zero.

When the torque command value of the motor-generator 110 is negative (Trqcom<0), the inverter 122 converts a DC voltage into an AC voltage and drives the motor-generator 110 in such a manner as to output a negative torque, through switching operations of the switching elements Q3 to Q8 according to the control signals S3 to S8 from the control device 140. Thus, the motor-generator 110 is driven in such a manner as to generate a negative torque.

The current sensor 160 detects three-phase currents (motor currents) iu, iv, and iw flowing through the motor-generator 110, and outputs signals indicating results of detection to the control device 140.

The rotational angle sensor (resolver) 165 detects a rotational angle θ of the motor-generator 110, and outputs a signal indicating a result of detection to the control device 140. The control device 140 can detect the number of revolutions (rotational speed) Nm of the motor-generator 110, from a speed of change in the rotational angle θ detected by the rotational angle sensor 165.

The temperature sensor 167 detects a temperature TM of the motor-generator 110, and outputs a signal indicating a result of detection to the control device 140.

The vehicle speed sensor 320 detects a speed (vehicle speed) V of the vehicle 1000, and outputs a signal indicating a result of detection to the control device 140.

The control device 140 controls the operations of the step-up/down converter 121 and the inverter 122 such that the motor-generator 110 outputs the torque corresponding to the torque command value Trqcom, based on the torque command value Trqcom input from an electronic control unit (superior ECU) (not shown) provided outside, the battery voltage VB detected by the monitoring unit 135, the system voltage VH detected by the voltage sensor 123, the motor currents iu, iv, and iw from the current sensor 160, and the rotational angle θ from the rotational angle sensor 165. The control device 140 generates the control signals S1 to S8 for controlling the step-up/down converter 121 and the inverter 122, and outputs the generated control signals to the step-up/down converter 121 and the inverter 122.

When the step-up/down converter 121 performs step-up operation, the control device 140 performs feedback control of the output voltage VH of the capacitor C2, and generates the control signals S1 and S2 such that the output voltage VH becomes equal to a voltage command VHr.

Besides, upon receiving a signal RGE indicating that the vehicle 1000 has entered a regenerative braking mode from the superior ECU, the control device 140 generates the control signals S3 to S8 in such a manner as to convert the AC voltage generated by the motor-generator 110 into a DC voltage, and outputs the generated control signals to the inverter 122. Thus, the inverter 122 converts the AC voltage generated by the motor-generator 110 into a DC voltage, and supplies the DC voltage to the step-up/down converter 121. The control device 140 generates the control signals S1 and S2 in such a manner as to step down the DC voltage supplied from the inverter 122, and outputs the generated control signals to the step-up/down converter 121. Thus, the AC voltage generated by the motor-generator 110 is converted into a DC voltage, stepped down, and supplied to the battery 130.

Furthermore, the control device 140 generates control signals for changing over the open/closed states of the system main relays SR1 and SR2, and outputs the generated control signals to the system main relays SR1 and SR2.

Configuration of Reactor L

Figure 2:
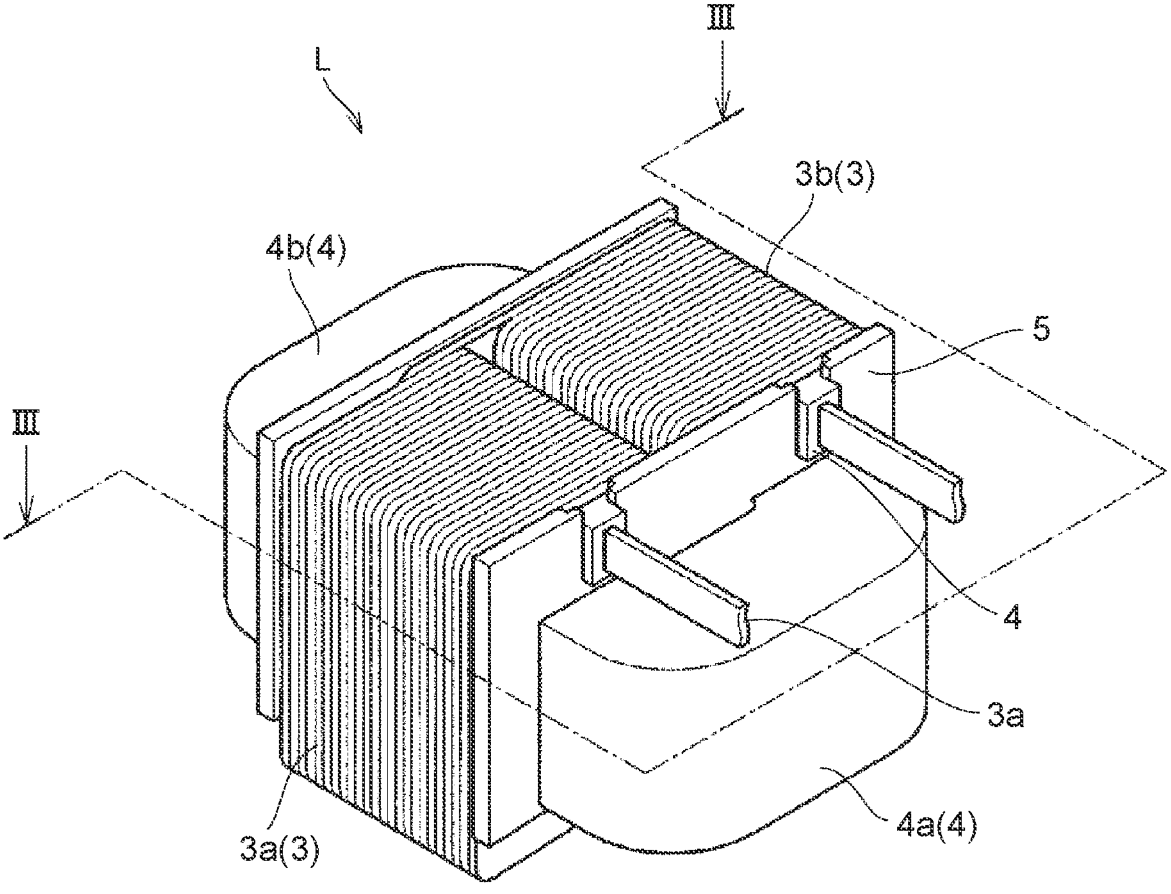
FIG. 2 is a perspective view of the reactor.
Figure 3:
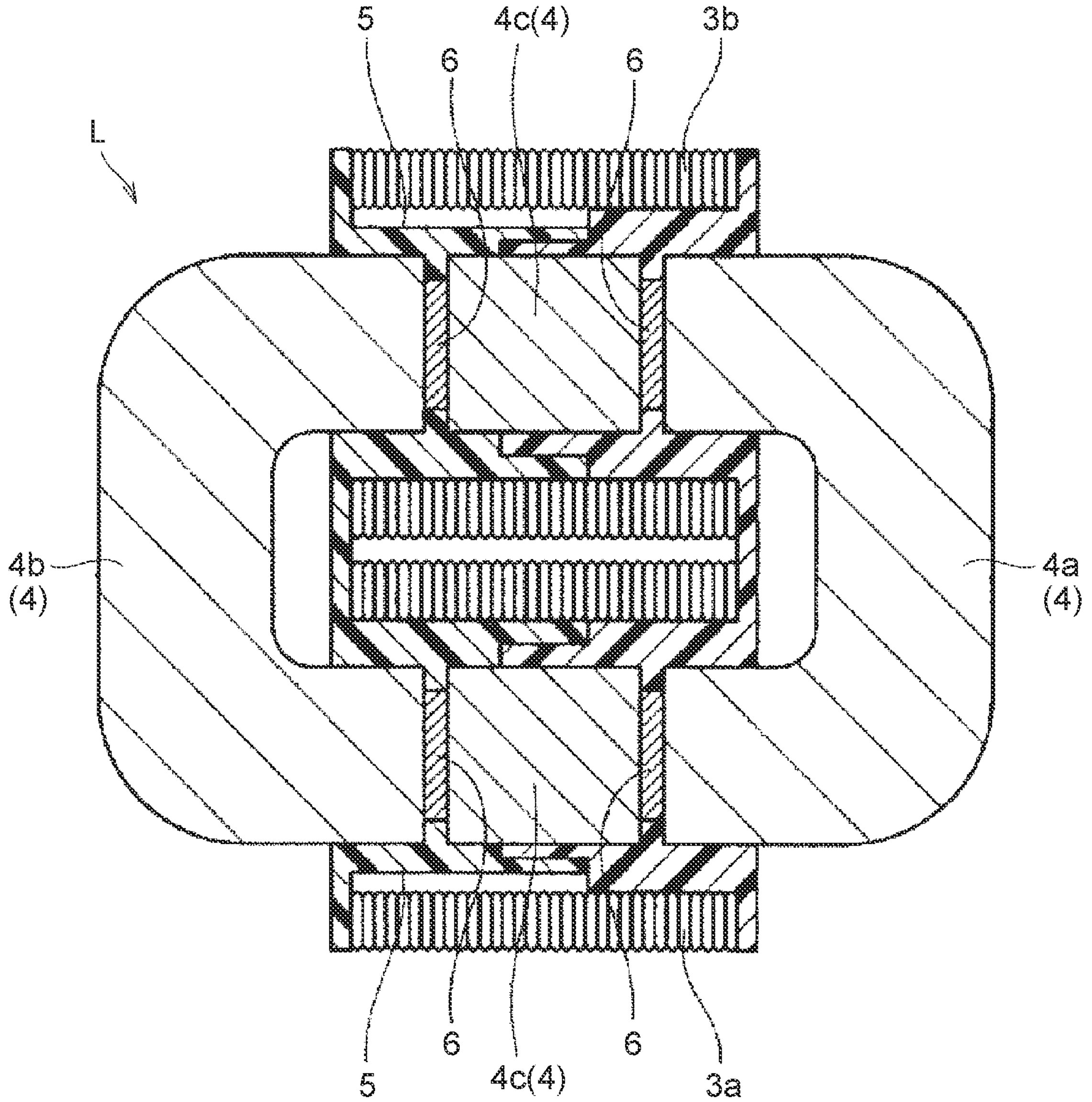
FIG. 3 is a cross-sectional view of the reactor along a line in FIG. 2.

The reactor L with which the vehicle 1000 shown in FIG. 1 is equipped will be described. FIG. 2 is a perspective view of the reactor L. FIG. 3 is a cross-sectional view of the reactor L along a line in FIG. 2.

The reactor L shown in FIGS. 2 and 3 is a receiving element having a ring-shaped core 4, and coils 3*a* and 3*b* wound around the core 4 at two locations. The two coils 3*a* and 3*b* will be referred to as the coils 3 when no distinction is made therebetween.

The core 4 has two U-shaped cores 4*a* and 4*b*, two I-shaped cores 4*c*, and four spacers 6. The two U-shaped cores 4*a* and 4*b* are arranged such that tips of U-shaped arms thereof face each other respectively, and are arranged such that the I-shaped cores 4*c* are interposed between the tips respectively. The spacers 6 are interposed between the tips of the U-shaped cores 4*a* and 4*b* and the I-shaped cores 4*c* respectively. The U-shaped cores 4*a* and 4*b* and the I-shaped cores 4*c* are joined to each other by the spacers 6 respectively, and the core 4 is shaped like a ring as a whole.

Regions of the I-shaped cores 4*c* form a pair of parallel regions in the ring-shaped core 4. The parallel regions (the I-shaped cores 4*c*) are covered with a bobbin 5 having two cylindrical portions, and the coils 3*a* and 3*b* are wound around the cylindrical portions of the bobbin 5 respectively. The two coils 3*a* and 3*b* are made of a single rectangular wire, and are electrically equivalent to a single coil. A gap is secured between the coils 3*a* and 3*b* as a pair of coils. The coils 3 assume the shape of a rectangular cylinder, and the core 4 is also rectangular in cross-section.

Configuration of Reactor Unit 1

Figure 4:
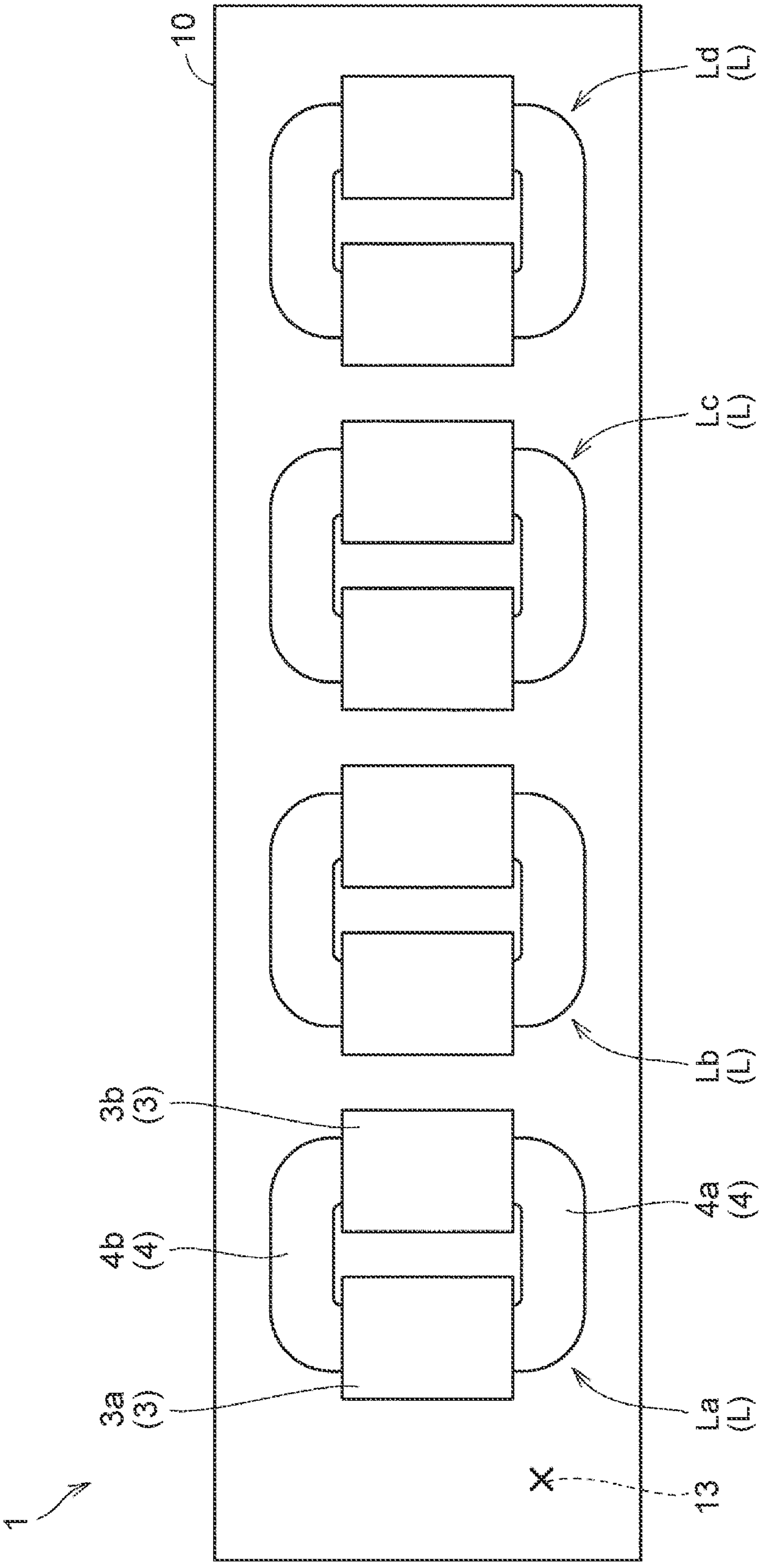
FIG. 4 is a plan view of a reactor unit.

FIG. 4 is a plan view of the reactor unit 1. As shown in FIG. 4, the reactor unit 1 is equipped with a plurality of (four in the embodiment) reactors L (La, Lb, Lc, and Ld). The reactor unit 1 is used in a multi-phase step-up converter. The multi-phase step-up converter is a device having a plurality of (four) step-up circuits connected in parallel to one another, and each of the step-up circuits is equipped with the single reactor L. The four reactors L of the four step-up circuits are assembled in the reactor unit 1. The bobbin 5 of each of the reactors L is not depicted in FIG. 4 and later-described FIG. 5.

The reactor unit 1 is equipped with a cooler 10 that cools the reactors L. The cooler 10 assumes the shape of a flat hollow box with low height, and is rectangular in a plan view. The four reactors L are attached to one lateral plate of the cooler 10. The four reactors L are arranged in line along a longitudinal direction of the cooler 10.

The reactor unit 1 is held in such a posture that the reactors L are mounted on the cooler 10 inside the box of the multi-phase step-up converter. The reactors L are located on the cooler 10, and the cooler 10 is located beneath the reactors L. Therefore, part of the cooler 10 overlapping with the reactors L is invisible in a plan view from above as shown in FIG. 4.

A flow passage 13 for coolant is formed inside the cooler 10. The coolant is water or long-life coolant (LLC). The cooler 10 has a coolant supply port (not shown) and a coolant discharge port (not shown) on, for example, a lateral surface thereof. At the coolant supply port and the coolant discharge port, the flow passage 13 leads to a circulation device (not shown). The coolant is supplied from the circulation device to the flow passage 13 through the coolant supply port. The coolant absorbs heat from the reactors L while flowing through the flow passage 13. The coolant is returned to the circulation device through the coolant discharge port. The cooler 10 cools the reactors L through radiation of heat to the coolant flowing through the flow passage 13.

Figure 5:
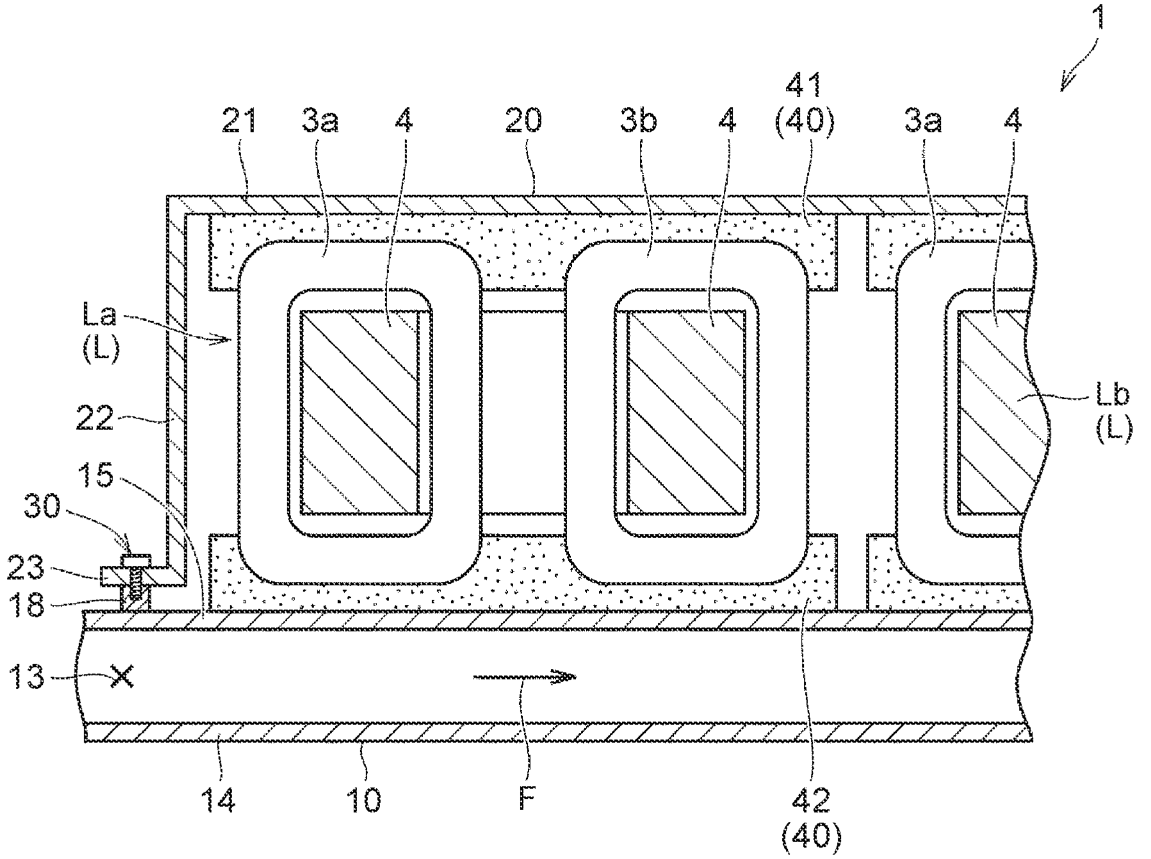
FIG. 5 is a partial cross-sectional view of the reactor unit.

FIG. 5 is a partial cross-sectional view of the reactor unit 1. The cooler 10 has a pair of lateral plates that separate the flow passage 13 and the outside from each other. The lateral plates are made of a material exhibiting high heat conductivity, for example, a metal material. The lateral plate to which the reactors L are attached will be referred to as an upper plate 15. The lateral plate facing the upper plate 15 will be referred to as a bottom plate 14. The four reactors L are mounted on an outer surface of the upper plate 15 (an upper surface of the upper plate 15). Other devices to be cooled by the cooler 10, for example, the inverter may be attached to the bottom plate 14.

The upper surface of the upper plate 15 and a lower surface of the bottom plate 14 constitute the outer surfaces of the cooler 10. The upper surface of the upper plate 15 that is one of the outer surfaces of the cooler 10 is equivalent to the reactor cooling surface of the disclosure that is mounted with the reactors L. The cooler 10 causes coolant to flow through an interior thereof, has the reactors L arranged outside thereof, and cools the reactors L. The cooler 10 has bosses 18 that protrude above from the upper surface of the upper plate 15. The bosses 18 are made of a material that is excellent in heat conductivity. The bosses 18 may be formed of the same material as the upper plate 15. The bosses 18 may be formed integrally with the upper plate 15.

An arrow F shown in the flow passage 13 indicates a direction in which the coolant flows. The four reactors L are aligned along the direction in which the coolant flows. An inner surface of the upper plate 15 (a lower surface of the upper plate 15 and a surface on the flow passage 13 side) may be provided with fins to enhance the heat conductivity of the upper plate 15 and improve the performance of cooling the reactors L.

Each of the reactors L has a lower surface facing the upper plate 15 of the cooler 10, and an upper surface that is a surface located opposite the lower surface. The lower surface of the reactor L is equivalent to the first surface of the disclosure, and the upper surface of the reactor L is equivalent to the second surface of the disclosure.

The reactor unit 1 is further equipped with a metal plate 20. The metal plate 20 is formed of a metal material exhibiting high heat conductivity. The metal plate 20 has a lid portion 21 that covers the reactors L from above, lateral wall portions 22 that cover the reactors L laterally, and edge portions 23 that protrude from the lateral wall portions 22 respectively. The metal plate 20 covers the upper surfaces of the reactors L.

The metal plate 20 (the lid portion 21) covers all the (four) reactors L included in the reactor unit 1 from above.

Upper edges of the lateral wall portions 22 lead to a peripheral edge of the lid portion 21. The edge portions 23 lead to lower edges of the lateral wall portions 22 respectively. The edge portions 23 protrude from the lateral wall portions 22 respectively in such a direction as to move away from the reactors L. The lid portion 21, the lateral wall portions 22, and the edge portions 23 may be integrally formed by bending a single flat plate. The metal plate 20 may be formed by joining separate members constituting the lid portion 21, the lateral wall portions 22, and the edge portions 23 to one another through, for example, welding.

Through-holes penetrating the edge portions 23 in a thickness direction thereof are formed through the edge portions 23 respectively. Fixation members 30 represented by bolts are fixed to the bosses 18 while penetrating these through-holes respectively. The fixation members 30 fix the metal plate 20 to the bosses 18 respectively. Thus, the metal plate 20 is thermally in contact with the upper surface of the upper plate 15 of the cooler 10.

The reactor unit 1 is further equipped with a heat radiating member 40. The heat radiating member 40 has an elastic force. The heat radiating member 40 has an upper member 41 that is arranged between the upper surfaces of the reactors L and the lid portion 21 of the metal plate 20, and a lower member 42 that is arranged between the lower surfaces of the reactors L and the upper surface of the upper plate 15 of the cooler 10. The upper member 41 is in surface contact with the upper surfaces of the reactors L. The upper member 41 is in surface contact with a lower surface of the lid portion 21. The lower member 42 is in surface contact with the lower surfaces of the reactors L. The lower member 42 is in surface contact with the upper surface of the upper plate 15.

At least one of the upper member 41 and the lower member 42 may be configured as a heat radiating sheet. A silicone sheet may be used as the heat radiating sheet.

Alternatively, at least one of the upper member 41 and the lower member 42 may be configured to include a gel material. The gel material may be synthetic resin. For example, the gel material may be urethane gel, silicone gel, or the like. The upper member 41 may be formed by applying the gel material to the lower surface of the lid portion 21. The lower member 42 may be formed by applying the gel material to the upper surface of the upper plate 15. At least one of the upper member 41 and the lower member 42 may have a covering layer that covers the gel material. This covering layer may be made of a resin material.

The upper member 41 and the lower member 42 may be formed of the same material. The upper member 41 and the lower member 42 may be formed of materials exhibiting the same heat conductivity. The upper member 41 and the lower member 42 may be formed of different materials. The upper member 41 and the lower member 42 may be formed of materials exhibiting different heat conductivities.

For example, the upper member 41 may be formed of a material exhibiting higher heat conductivity than that of the lower member 42. A heat conduction path extending from the upper surfaces of the reactors L to the cooler 10 via the metal plate 20 is longer than a heat conduction path extending from the lower surfaces of the reactors L to the cooler 10. The homogeneity between the amount of heat radiation from the upper surfaces of the reactors L via the upper member 41 and the amount of heat radiation from the lower surfaces of the reactors L via the lower member 42 can be enhanced by adjusting the heat conductivities of the upper member 41 and the lower member 42. Thus, the difference between the temperature of the upper surfaces of the reactors L and the temperature of the lower surfaces of the reactors L can be reduced.

Operation and Effect

The configuration, operation, and effect peculiar to the present embodiment will be summarized as follows, although this summary overlaps with the foregoing description.

As shown in FIG. 5, the reactor unit 1 is equipped with the metal plate 20. The metal plate 20 covers the upper surfaces of the reactors L. The metal plate 20 is thermally in contact with the upper surface of the upper plate 15 of the cooler 10.

The heat generated by the reactors L is transferred from the upper surfaces of the reactors L to the metal plate 20. The heat is transferred from the metal plate 20 to the cooler 10, and is wasted to the coolant flowing inside the cooler 10. The reactors L are cooled by forming a heat radiation path from the upper surfaces of the reactors L to the cooler 10 by the metal plate 20. Heat is radiated from both the upper surfaces and the lower surfaces to the cooler 10, so the capability of cooling the reactors L can be enhanced. The difference between the temperature of the upper surfaces of the reactors L and the temperature of the lower surfaces of the reactors L can be reduced by enabling radiation of heat to the cooler 10 from the upper surfaces of the reactors L from which only heat radiation through the atmosphere was possible conventionally, and promoting the cooling of the upper surfaces. Thus, the temperature of the cores 4 at the centers of the reactors L can be lowered, so the output of the reactors L can be increased.

The metal plate 20 that is arranged above the reactors L also functions as a shield plate for shielding the reactors L. Thus, a load can be restrained from being input to the reactors L from the outside, and the reliability of the reactors L can be enhanced. In addition, the metal plate 20 restrains vibrations of the reactors L from being transmitted to external devices, so the reliability of the external devices can also be enhanced.

As shown in FIG. 5, the reactor unit 1 is equipped with the heat radiating member 40. The heat radiating member 40 has an elastic force. The heat radiating member 40 has the lower member 42 that is arranged between the lower surfaces of the reactors L and the upper plate 15 of the cooler 10, and the upper member 41 that is arranged between the upper surfaces of the reactors L and the lid portion 21 of the metal plate 20.

The efficiency of heat conduction from the reactors L to the cooler 10 can be enhanced, and the performance of cooling the reactors L can be enhanced, by interposing the lower member 42 between the reactors L and the cooler 10, and interposing the upper member 41 between the reactors L and the metal plate 20. The heat radiating member 40 can be made to function as a damper for damping kinetic energy, by adopting an elastic body as the heat radiating member 40. Thus, it is possible to suppress the transmission of vibrations of the reactors L, and reduce noise and vibrations.

The heat radiating member 40 shown in FIG. 5 includes a gel material. The areas of contact of the heat radiating member 40 with the reactors L, the cooler 10, and the metal plate 20 can be increased by applying the heat radiating member 40 including the gel material. The efficiency of heat conduction from the reactors L to the cooler 10 can be enhanced, so the performance of cooling the reactors L can be further enhanced.

Incidentally, in the foregoing embodiment, the example in which the heat radiating member 40 has the upper member 41 and the lower member 42 and both the upper surfaces and the lower surfaces of the reactors L are provided with the heat radiating member 40 has been described. Either the upper surfaces or the lower surfaces of the reactors L may be provided with the heat radiating member 40. The region where the heat radiating member 40 is provided can be appropriately changed in such a manner as to correspond to the generation of heat by the reactors L and the vibrations caused by the reactors L. The lower surfaces of the reactors L may be directly in contact with the upper surface of the upper plate 15 of the cooler 10 without the intermediary of the heat radiating member 40. The upper surfaces of the reactors L may be directly in contact with the lower surface of the lid portion 21 of the metal plate 20 without the intermediary of the heat radiating member 40.

The metal plate 20 is not absolutely required to assume a shape having the lid portion 21, the lateral wall portions 22, and the edge portions 23. The metal plate 20 may assume any shape as long as radiation of heat from the upper surfaces of the reactors L to the cooler 10 can be realized via the metal plate 20. The fixation of the metal plate 20 to the cooler 10 is also optional. Instead of the example in which the fixation members 30 of the embodiment are used, the fitting of the metal plate 20 and the bosses 18, the direct joint of the metal plate 20 to the upper plate 15 through, for example, welding, and the like are applicable.

In the embodiment, the example in which the reactors L are located above the cooler 10 and the lower surfaces of the reactors L face the upper surface of the upper plate 15 of the cooler 10 has been described. The reactors L may be arranged below the cooler 10. In this case, the aforementioned effect of enabling the enhancement of the performance of cooling the reactors L can be obtained in the same manner, by applying the metal plate 20 that covers the lower surfaces of the reactors L and that is thermally in contact with the bottom plate 14 of the cooler 10.

The weight of the metal plate 20 can be relatively freely designed, and the spring constant of the heat radiating member 40 having an elastic force can also be relatively freely selected, by adopting a configuration of the embodiment in which the lower surfaces of the reactors L face the upper surface of the upper plate 15 of the cooler 10 and the upper surfaces of the reactors L are covered with the metal plate 20. Accordingly, a dynamic damper effect can be obtained in a desired region.

The embodiment disclosed herein should be construed as being exemplary and non-restrictive in all respects. The scope of the disclosure is defined not by the foregoing description but by the claims, and the disclosure is intended to encompass all the alterations that are equivalent in significance and scope to the claims.

What is claimed is:

1. A reactor unit comprising:

a reactor;

a cooler that has an interior through which a coolant flows and that cools the reactor through radiation of heat to the coolant, the cooler having a reactor cooling surface that is one of outer surfaces of the cooler, the reactor being mounted on the reactor cooling surface, and the reactor having a first surface facing the reactor cooling surface and a second surface that is a surface located opposite the first surface;

a metal plate that covers the second surface and that is thermally in contact with the reactor cooling surface;

a first heat radiating member having an elastic force and including a gel material, the first heat radiating member being arranged between the first surface and the reactor cooling surface; and a second heat radiating member having an elastic force and including a gel material, the second heat radiating member being arranged between the second surface and the metal plate, wherein the second heat radiating member has a heat conductivity higher than a heat conductivity of the first heat radiating member.

* * * * *